United States Patent [19]
Herolf

[11] Patent Number: 4,984,961
[45] Date of Patent: Jan. 15, 1991

[54] METHOD FOR HANDLING AND TRANSPORTING LOGS FROM FELLING SITE TO CONSUMER, AND ROAD VEHICLE FOR CARRYING OUT THE METHOD

[75] Inventor: Olof Herolf, Sundsvall, Sweden

[73] Assignee: OSA AB, Alfta, Sweden

[21] Appl. No.: 346,995

[22] PCT Filed: Jun. 13, 1988

[86] PCT No.: PCT/SE88/00316
  § 371 Date: Mar. 23, 1989
  § 102(e) Date: Mar. 23, 1989

[87] PCT Pub. No.: WO89/00808
  PCT Pub. Date: Feb. 9, 1989

[30] Foreign Application Priority Data
  Jul. 24, 1987 [SE] Sweden .................. 8702957

[51] Int. Cl.⁵ .................. A01G 23/08; B60P 1/48
[52] U.S. Cl. .................. 414/786; 144/256;
    144/335; 144/256.1; 414/470; 414/555;
    414/559; 414/538
[58] Field of Search ........... 414/786, 538, 470, 546,
    414/555, 550, 559; 209/517, 518; 144/335, 336,
    338, 339, 3 D, 34 R, 256

[56] References Cited

U.S. PATENT DOCUMENTS

| | | | |
|---|---|---|---|
| 892,621 | 7/1908 | Ratliff | 414/538 |
| 1,339,290 | 5/1920 | Schaefer | 414/538 |
| 3,623,521 | 11/1971 | Shields | 144/338 |
| 3,659,635 | 5/1972 | Mellgren | 144/3 D X |
| 3,768,529 | 10/1973 | McColl | 144/338 |
| 4,119,222 | 10/1978 | Kaarnametsa | 414/470 |
| 4,185,672 | 1/1980 | Vit et al. | 209/518 X |
| 4,881,865 | 11/1989 | Herolf | 414/550 |

FOREIGN PATENT DOCUMENTS

| | | | |
|---|---|---|---|
| 863922 | 1/1953 | Denmark . | |
| 47709 | 11/1973 | Finland . | |
| 653882 | 3/1929 | France . | |
| 1004667 | 4/1952 | France . | |
| 126929 | 12/1949 | Sweden . | |
| 148979 | 2/1955 | Sweden . | |
| 149181 | 3/1955 | Sweden . | |
| 156628 | 3/1967 | Sweden . | |
| 311318 | 6/1969 | Sweden . | |
| 191947 | 4/1967 | U.S.S.R. | 414/555 |
| 316593 | 1/1972 | U.S.S.R. . | |
| 404771 | 3/1974 | U.S.S.R. | 414/470 |
| 410994 | 5/1974 | U.S.S.R. . | |
| 570511 | 8/1977 | U.S.S.R. | 414/550 |

Primary Examiner—David A. Bucci
Attorney, Agent, or Firm—McFadden, Fincham, Marcus & Allen

[57] ABSTRACT

The invention relates to a method for handling and transporting logs from felling site to consumer, the logs being loaded at the felling site on a cross-country vehicle (1) which carries the logs to a landing where they are unloaded and loaded anew, viz. on a road vehicle which tranports the logs to the consumer. The logs loaded on the road vehicle (1) are bundled, preferably already at the felling site, by means of chains (17) to form a bundle of logs which is maintained intact or unbroken during reloading from the cross-country vehicle (1) to the road vehicle.

5 Claims, 4 Drawing Sheets

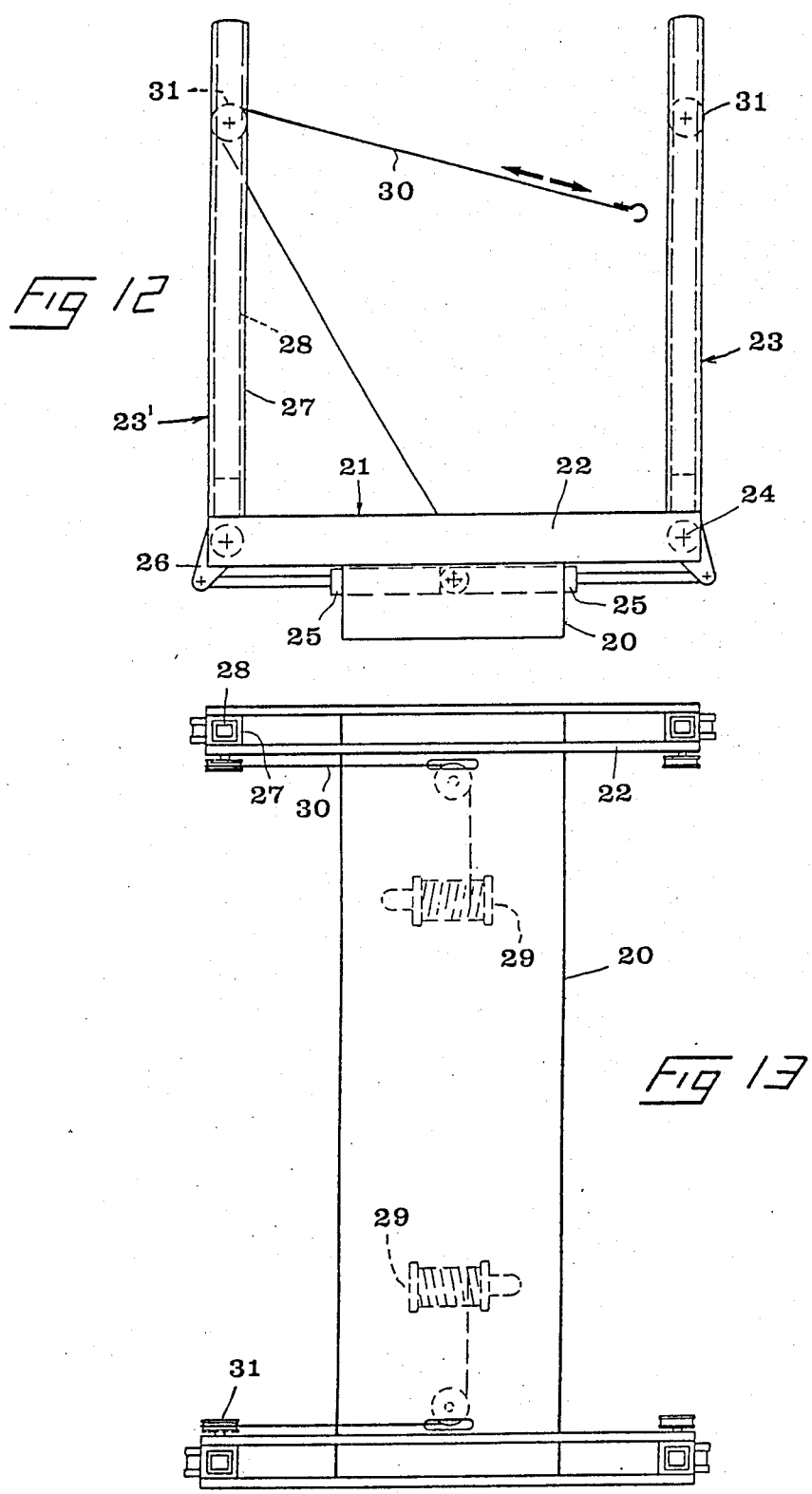

METHOD FOR HANDLING AND TRANSPORTING LOGS FROM FELLING SITE TO CONSUMER, AND ROAD VEHICLE FOR CARRYING OUT THE METHOD

TECHNICAL FIELD OF THE INVENTION

The invention relates to a method for handling and transporting logs from felling site to consumer, the logs being loaded at the felling site on a cross-country vehicle which carries the logs to a landing where they are unloaded and loaded anew, viz. on a road vehicle which transports the logs to the consumer, the logs loaded on said cross-country vehicle being bundled, preferably already at the felling site, by means of chains or the like to form a bundle.

BACKGROUND OF THE INVENTION

In known, conventional methods for transporting logs in the form of saw timber or pulp wood from felling site to consumer, the processing, i.e. felling, limbing and cutting of the logs, is usually carried out by means of a cross-country harvester, whereupon a separate cross-country forwarder collects the logs and transports them up to a landing preferably along a main haul road, which can be reached by a road vehicle. The individual logs are loaded on the forwarder one by one or in small bundles by means of a crane which is mounted on the forwarder and which is also used for unloading the logs at the landing. Here the logs are sometimes unloaded in large stacks (frequently containing hundreds of cubic meters or more) from which the logs are also loaded in bundles onto the road vehicle, however by means of a crane mounted on the road vehicle or by a separate loader.

One drawback of the transporting and handling technique described above is that both producer and consumer can form only a vague idea of the character of the logs felled and transported to the landing, with regard to the total volume, thickness, length and partial volumes of the different tree species in the lot. The different stacks are roughly divided roughly into saw timber and pulp wood, but within the scope of these classification criteria, highly varying partial volumes of spruce and pine, thick and thin as well as long and short logs may occur in e.g. a saw timber stack. This is most unsatisfactory in so far as a certain saw mill is, on a certain occasion, perhaps mainly interested in e.g. thick and long logs of a determined tree species, while other saw mills may have other preferences.

The known transporting technique is further ineffective in so far as reloading from the cross-country vehicle to the road vehicle is time-consuming and thus expensive, since both unloading from the cross-country vehicle and loading on the road vehicle is carried out in bundles by means of fairly small cranes. Furthermore it is a biologically detrimental condition that the wood remains at the landing for a more or less long period, before being collected by the road vehicle. It may particularly happen that certain log quantities which have been felled early, remain for a longer period than other quantities felled on a later occasion. In practice, each such delay results in drought cracks and insect attacks which deteriorate the quality, especially of saw timber.

BRIEF DESCRIPTION OF THE INVENTIVE IDEA

The present invention aims at eliminating the above-mentioned drawbacks and creating opportunities for effective handling and transporting of wood from felling site to consumer. To this end, the method mentioned by way of introduction is characterised in that the bundle is maintained intact or unbroken during reloading from the cross-country vehicle to the road vehicle, the reloading being effected in that the bundle is hauled up from a ground position to a position resting on the load carrier of the vehicle, via log slides which are inclined against the ground.

FURTHER DESCRIPTION OF PRIOR ART

SE patent application No. 67003604 and SE published application No. 311,318 describe forest machines which facilitate bundling of felled logs already at the felling site. For economic reasons, these machines can however not be used for transporting the logs all the way from the felling site to the consumer and, in actual practice, it is also not possible to load large bundles of logs directly from the forest machine onto a road vehicle, since the road vehicle would then be idle for long periods before making a full load.

In a preferred embodiment of the invention, the logs are processed by means of a processing unit which in per se known manner comprises a measuring and recording equipment for reading and data recording the characteristics of individual logs with regard to length, diameter and/or tree species, and only logs recorded by said equipment are loaded on the cross-country vehicle, while providing a log bundle which is suitably marked or coded to be individually identifiable with regard to its contents and which is transported in its intact state from felling site to consumer.

In addition to the method proper, the invention also relates to a road vehicle for carrying out the method. The specific features of the inventive road vehicle are stated in the appended claims.

BRIEF DESCRIPTION OF THE ACCOMPANYING DRAWINGS

In the drawings:

FIG. 12 is an enlarged end view of the frame of said road vehicle, and FIG. 13 is a plan view of said frame.

DETAILED DESCRIPTION OF THE INVENTION

Figure 1:
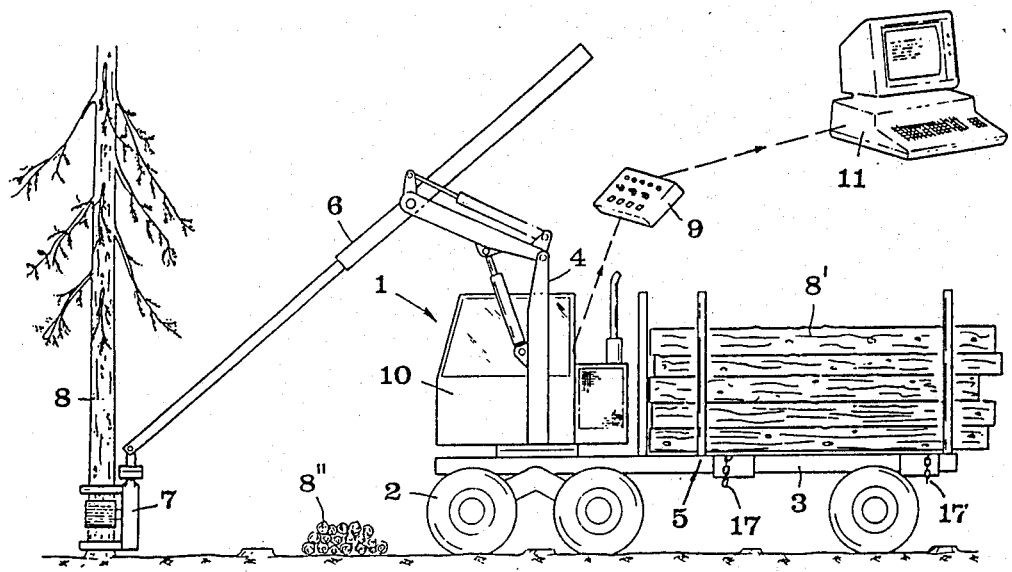
FIG. 1 is a side view of a cross-country vehicle during felling.
Figure 2:
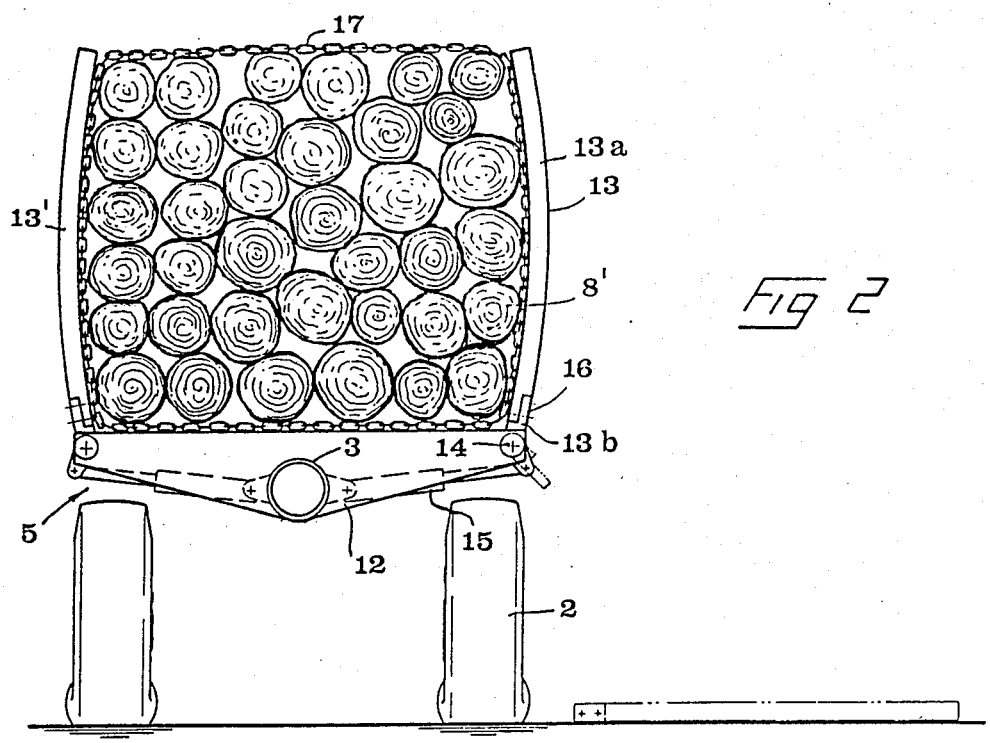
FIG. 2 is a simplified end view of the same vehicle carrying a log bundle.
Figure 3:
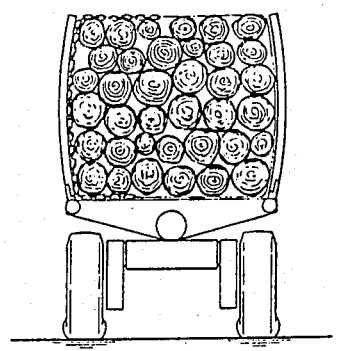
FIGS. 3–6 are cross-sectional views of the same cross-country vehicle during four different steps of unloading of the log bundle.

In FIGS. 1 and 2, a cross-country vehicle is generally designated 1 and has, in this embodiment, the form of a combined harvester and forwarder. An especially preferred design of the vehicle is described in Swedish patent application 8602629-1. Thus, the vehicle comprises a chassis 3 mounted on wheels 2 and supporting a crane structure 4 and a load carrier 5. The crane structure 4 which is preferably rotatable through 360° relative to the chassis 3, suitably comprises a telescopically extensible outer boom 6 whose free end is provided with a processing unit 7 which in conventional manner can fell, limb and cut the trees 8 to be logged. Preferably, this unit has the shape of a so-called single-grip harvester. The vehicle also comprises a measuring and recording equipment for reading and data recording the characteristics of individual logs with respect to length, diameter (continuous measuring of the diameter along the entire log) and/or tree species. The unit 7 thus comprises suitable sensors which are connected to a computer 9 disposed in e.g. the driver's cab 10. The sensors of the processing unit 7 thus sense both the diameter and the length of the logs which are cut from the individual, felled trees, while the operator in the driver's cab can enter the tree species in the computer 9. The vehicle computer 9 can suitably cooperate with one or more consumers' host computer 11, such as in the first place an administration department (or a user terminal, a saw mill and/or a pulp mill).

Figure 5:
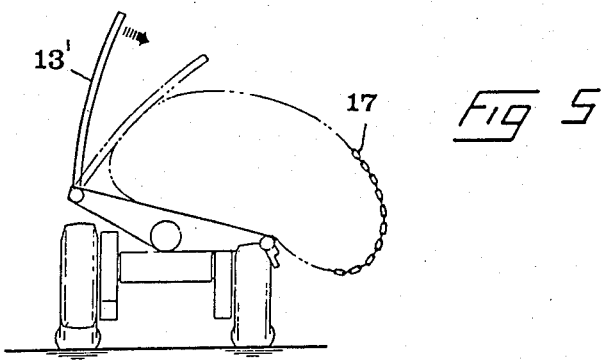
Figure 6:
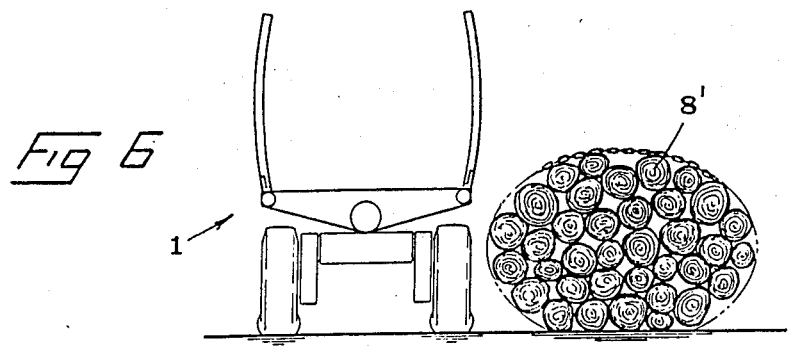
Figure 7:
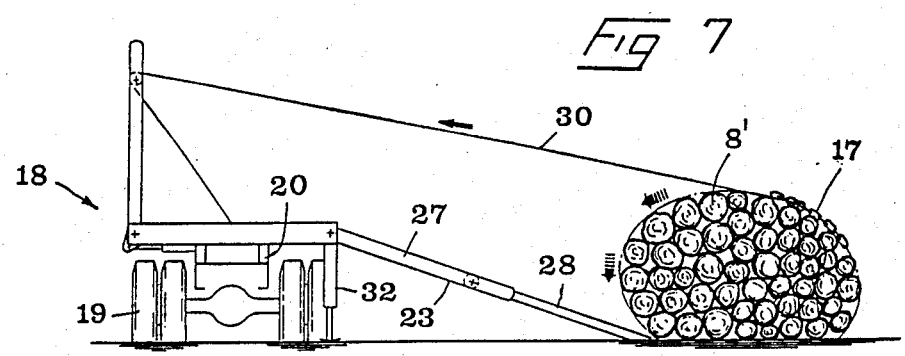
FIGS. 7–11 are end views illustrating five different steps of loading a log bundle onto a road vehicle according to the invention.
Figure 8:
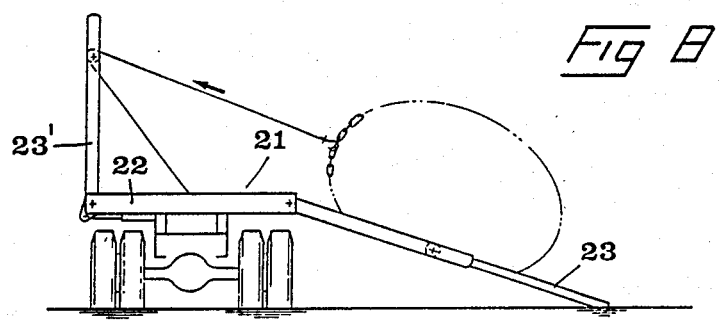
Figure 9:
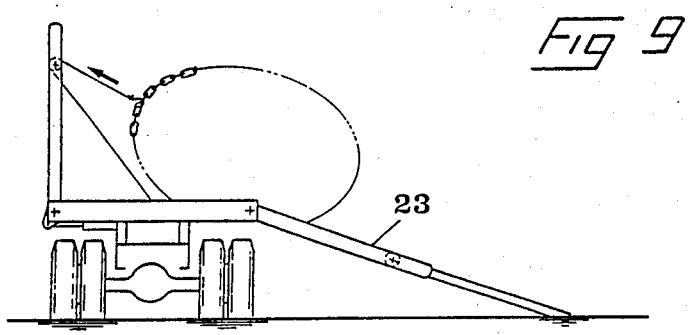
Figure 10:
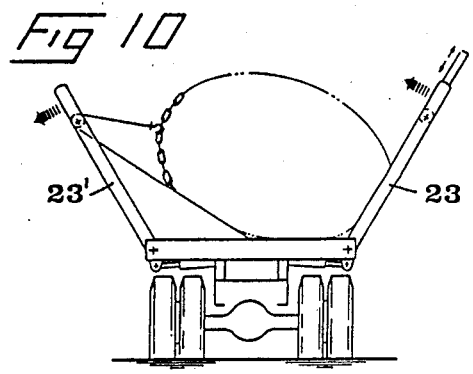

In actual practice, the load carrier 5 of the cross-country vehicle 1 preferably consists of an appropriate amount of transverse bunks 12 each of which is, at both ends, provided with upright posts 13, 13' serving to keep the logs on the bunks, the actual chassis preferably having, in conventional manner, the shape of a pipe 3. The posts 13, 13' are connected to the bunks 12 via joints 14 which allow pivotment of the posts relative to the bunks. The posts are pivoted by means of double-acting hydraulic cylinders 15. Each post is, via a connection 16, divided into an upper portion 13A and a lower portion 13B, the first-mentioned being separable from the last-mentioned. It should further be pointed out the load-carrying bunks 12 can, when necessary, be tilted or inclined to either side in relation to the horizontal position shown in FIG. 2, for example as illustrated in FIG. 5.

In FIG. 1, the logs loaded on the vehicle 1 and being of saw timber type, are designated 8', while a number of pulp wood logs are designated 8". Moreover, two chains or wires are shown in FIGS. 1 and 2 and generally designated 17, for bundling the load of logs lying on the load carrier 5.

Reference is now made to FIGS. 7-13 which illustrate schematically a road vehicle 18 according to the invention. In per se known manner, the vehicle 18 comprises a chassis or frame 20 mounted on wheels 19, said frame either being included in a pulling vehicle with a driver's cab or being part of a trailer. The frame supports in turn a carrier designated 21 in its entirety and preferably consisting of a number of spaced-apart, transverse bunks 22, each of which is provided with upright posts 23, 23' at both ends. See FIG. 12.

According to the principle of the invention, at least one and, in practice, suitably each of the two posts 23, 23' is connected to the associated load bunk 22 via a joint 24 which allows the post to be pivoted from its normal upright transport position to a position in which the post is inclined against the ground and can serve as a slide for hauling up a log bundle from the ground. For such pivotment of the individual post between the two positions, each post is connected with a double-acting hydraulic cylinder or power mechanism 25. Advantageously, the cylinder of each such mechanism is articulated with the frame, while the piston rod is articulated with a lug 26 extending slightly beneath the joint 24 and rigidly connected with the post as such. In a preferred embodiment, the individual post 23 comprises two or more members 27, 28 which are relatively telescoping so as to facilitate extension of the post when being folded down to its inclined position. Two hoists or winches 29 are built into the frame 20, each of which comprises a line, wire 30 or the like which can be passed over a deflecting roller 31 mounted on either of the two opposite posts 23, 23'. Preferably, the two winches 29 are individually operable to allow adjustment of the log bundle to be hauled up, and remote-controlled to allow an operator standing outside the vehicle to control the winches, for instance via radio.

CARRYING OUT THE INVENTIVE METHOD

In a final felling stand mainly consisting of full-grown trees, the trees 8 are felled by means of the processing unit 7 of the vehicle 1, as shown in FIG. 1. From the individual tree, logs of different thickness are obtained, one of which is however, more often than not, so thick that it can be used as saw timber. Usually, a plurality of thinner, pulp-wood type logs are also obtained from the tree. Of these log types, only saw timber logs 8 are loaded on the load carrier 5 of the vehicle 1 in connection with the felling, while the thinner pulp wood logs 8" are stacked on the ground, without being immediately taken care of. During processing, the measuring and recording equipment 9 performs reading and data recording of at least the logs 8' which are classified as saw timber and are to be loaded on the vehicle (in actual practice, also the pulp wood logs 8" are recorded). At least the number, length and diameter of the logs are recorded, and, if the stand is not biologically uniform, also the tree species. The measuring of the volume (i.e. length x continuous measuring of the diameter) is carried out automatically by means of sensors in the processing unit 7, in combination with the computer 9, whereas the tree species is entered manually in the computer 9. Suitably, all the wood felled in the stand is recorded. After the load carrier of the vehicle has been fully loaded, i.e. the logs have been loaded on a level with the upper portions of the posts 13, 13', the two chains 17 are laid around the logs to form a bundle or bundle unit whose contents are individually recognizable after the earlier data recording of each individual log. It has been recorded in the computer how many logs the bundle contains, which volume each of the logs has and which tree species are represented. The bundle thus obtained can further be marked, for example by coding in the computer, by manual application of a marking tag and/or by color marking of the bundle proper (alternatively, both coding and marking can be used).

It should be emphasized that during the felling procedure, the operator can at a first stage preferably select all thick trees suited as saw timber, whereas the other trees are left to be felled later on.

Figure 4:
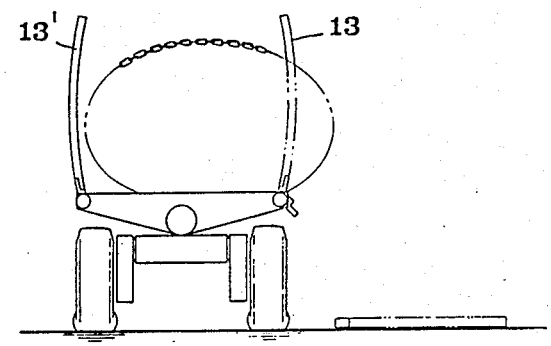

From the felling site, the vehicle 1 is driven to the landing which suitably is positioned along a main haul road or some other place which is easily accessible to a road vehicle. At the landing, unloading is carried out as shown in FIGS. 3-6. In a first step shown in FIG. 4, the posts 13 on one side of the vehicle are folded down and removed, whereby the log bundle on the bunks 12 is automatically transformed from its substantially square cross-sectional shape into the substantially elliptic cross-sectional shape as shown in FIG. 4 (or some other shape determined by the chains). In the next step shown in FIG. 5, the bunks 12 are tilted, optionally combined with a pivotment of the posts 13' inwardly towards the center of the load carrier, whereby the bundle still held together by the chains 17 falls off from the bunks and takes the ground position shown in FIG. 6. The dumping of the bundle can be effected either by merely pivoting the bunks 12 relative to the chassis or by lifting one of a pair of front wheels interconnected via a yoke and lowering the other, thus inclining the entire vehicle (or by a combination of these actions). After the bundle of logs has been dumped from the vehicle in this manner, the posts 13 are reerected, whereupon the vehicle 1 returns to the felling site.

Figure 11:
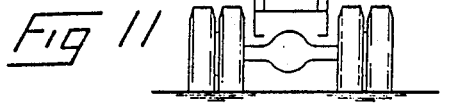

Reference is now made to FIGS. 7-11 which illustrate how the bundle of logs landed at the landing is loaded on the road vehicle 18. This vehicle is parked at some distance from the bundle of logs, the longitudinal direction of the vehicle being substantially parallel to the longitudinal direction of the logs 8'. Optionally, one or more supports 32 are mounted or activated beneath the side of the load carrier or bunks facing the bundle of logs. The posts 23 on said side of the load carrier are folded down by means of the hydraulic cylinders 25 to a position in which they are inclined from the load carrier and in which the inner telescopic tubes 28 can be pulled out of the outer telescopic tubes 27 to have their free end positioned under the part of the bundle which faces the vehicle. The two or more posts thus folded down and extended now serve as slides for the bundle of logs. A hook or the like at the free end of each line 30 is then attached to each of the chains 17, more precisely in a point located as low down as possible on the side of the bundle facing away from the vehicle. When traction is applied to the two lines, by operation of the winches 29, the bundle of logs rotates around its own axis and rolls as illustrated by the arrows in FIG. 7, while rolling onto the posts serving as slides. When the bundle of logs in its entirety is in position on the posts, the bundle can, without excessive frictional resistance, be hauled up along the posts onto at least parts of the bunks 22, which is not possible from a position on the ground. In the final phase of the hauling, the posts 23' can be pivoted outwards a distance to the position shown in FIG. 10, at the same time as the posts 23 previously folded down are pivoted upwards so as to move the bundle upwards which is still elliptic in cross-section. Finally, the posts on both sides of the vehicle are pivoted to their normal vertical position as shown in FIG. 11, whereby the bundle of logs is forced to be transformed to the substantially square cross-sectional shape as shown in FIG. 11. The road vehicle 18 can thus be loaded without assistance from any crane whatsoever (which would necessarily be complicated, heavy and expensive to be able to lift the excessively heavy bundle of logs). Thus loaded on the vehicle 18, the bundle of logs is transported from the landing to the terminal or user. In other words, the bundle of logs identified or marked already at the felling site, is transported in its intact or unbroken state all the way from the felling site to the user. In actual practice, this brings a great variety of advantages. Thus, the transportation from felling site to industry can—when properly organized —be made quick and effective, documentation regarding the contents of each bundle of logs being given from the felling cross-country vehicle either directly or indirectly to the user who obtains an excellent survey of the raw material ordered, which in turn highly facilitates the user's own production. Moreover, the inventive method renders it possible to ensure rapid transportation of all wood, since the documentation described above exactly states the time when a given bundle of logs was felled, which means that a desired bundle can rapidly reach the user. Further advantages are that the risk of theft is minimized since the felled logs are permanently kept in chained bundles, and that the wood can be transported to the saw mill in an uncomplicated manner.

Also the pulp wood logs 8" which have initially been left in the forest, can be bundled and recorded as described above, the thus obtained bundles being kept intact or unbroken from felling site to user. For loading the pulp wood logs, a simple forwarder can be used instead of the combined harvester-forwarder which is shown in FIG. 1 and which is highly suitable for handling saw timber logs.

CONCEIVABLE MODIFICATIONS OF THE INVENTION

Of course, the invention is not limited to the embodiment described above but can be modified in many ways within the scope of the appended claims. Thus, it is also conceivable to use the inventive method without data recording of the contents of the bundles, although this is per se preferred. It is further possible to use a separate harvester and a forwarder which cooperate at the felling site. It should further be noted that two or more bundles of logs can be loaded at the same time on the cross-country vehicle (as well as on the road vehicle), instead of only one as exemplified in FIG. 1.

The term "intact" as used above and in the appended claims is, of course, to be interpreted such that the bundle maintains the same contents during reloading, even if during this procedure the bundle changes from square to elliptic shape, and vice versa, as described above.

What is claimed is:

1. In a method of handling and transporting logs from a felling site to a consumer, wherein logs are cut by a tree processing device, the diameter and length of individual logs are measured by a sensing means associated with said tree processing device to generate diameter and length measurement data, said diameter and length measurement data are recorded in measuring and data recording device, and the individual logs whose diameter and length measurements have been recorded are first loaded at said felling site onto a cross-country log carrying vehicle, transported to a second site wherein said logs are unloaded from said cross-country vehicle and reloaded on a log transporting road vehicle for delivery to a consumer, the improvement which comprises:

forming a unitary movable and transferrable bundle of said individual logs on said cross-country log carrying vehicle;

marking or coding said unitary bundle of said individual logs to identify said bundle relative to the data recorded in said data recording device;

transporting the resulting marked or coded unitary bundle of individual logs on said cross-country log carrying vehicle from said felling site to said second site;

unloading the marked or coded unitary bundle of individual logs from said cross-country log carrying vehicle as an integral bundle;

reloading the marked or coded unitary bundle or individual logs to a log transporting road vehicle with said unitary bundle remaining intact; and transporting the reloaded marked or coded unitary bundle of individual logs to a consumer.

2. A method as claimed in claim 1, wherein said tree processing device is mounted on said cross-country log carrying vehicle.

3. A method as claimed in claim 1, wherein only logs of a predetermined size, determined by said sensing means, are loaded on said cross-country log carrying vehicle.

4. A method as claimed in claim 1, further including the step of entering into the data recording device the species of tree.

5. A method as claimed in claim 1, wherein the individual logs are bundled by at least one chain.

* * * * *